Patented June 2, 1931

1,807,682

UNITED STATES PATENT OFFICE

FRITZ BALLAUF, FRIEDRICH MUTH, AND ALBERT SCHMELZER, OF ELBERFELD, GERMANY, ASSIGNORS TO GENERAL ANILINE WORKS, INC., OF NEW YORK, N. Y., A CORPORATION OF DELAWARE

DIAZOTIZATION OF AMINO CARBAZOLE AND ITS DERIVATIVES

No Drawing. Application filed December 27, 1928, Serial No. 328,845, and in Germany January 5, 1928.

The present invention relates to the manufacture of substitution products of carbazole from amino-carbazoles and to new products obtainable thereby.

The diazo compounds from 3-amino carbazole and its N-ethyl derivative, described in the literature (see for example, Morgan & Read, J. C. S. 121, 2709) react essentially differently from the diazo compounds of aromatic amines.

By treating these compounds with copper powder and sulfurous acid, only carbazole, but no sulfinic acid is obtained, (see C. G. Schwalbe and S. Wolff Ber. 44, 234), likewise by the treatment with copper thiocyanate, carbazole alone is produced (Schwalbe 1. c.). When the diazo solution is boiled, a complicated abnormal principal reaction takes place, and as the main product, a greenish brown amorphous mass separates, containing the 3-hydroxy carbazole only to a small extent (O. Ruff & V. Stein, Ber. 34, 1683). Even when certain precautionary measures are employed, only a very small yield of 3-chloro carbazole is obtained from carbazole-3-diazonium clhoride (Tucker J. C. S. 125, 1144–48) and mainly carbazole.

Thus, derivatives of carbazole are only producible with great difficulty or not at all from 3-amino carbazole through the diazo compounds according to the known methods.

In accordance with the present invention, carbazole derivatives are prepared by diazotizing in the usual manner a carbazole of the general formula:

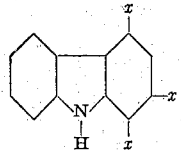

wherein one $x$ stands for an amino group and the other $x$'s stand for hydrogen or any monovalent substituent, for example halogen, alkyl and wherein the carbazole nucleus may be further substituted, and subjecting the diazo compounds to the reactions customarily employed to diazotized aromatic amines for replacing the diazonium group by monovalent substituents (compare Houben, Die Methoden der Organischen Chemie 1924, volume 4, page 611 to 633). The diazo compounds of the carbazole may be separated by salting out the same and re-dissolving in water for preparing the desired derivative thereof, or the diazo solution as originally obtained may be used.

Thus an almost quantitative yield of carbazole-2-sulfinic acid is obtainable by the treatment of 2-amino carbazole with copper powder and sulfurous acid. By boiling 1- or 2-diazo-carbazole, 1- or 2-hydroxy-carbazole is obtained in an amount of over 80% of the theory; by boiling the diazo compounds with cuprous chloride or with sodium cyanide in the presence of copper powder, the chlorides or nitriles respectively are obtainable.

Thus a large number of carbazole derivatives not heretofore described in the literature have become available, for example, hydroxy carbazoles and ethers and esters thereof, halogen carbazoles, cyano carbazoles and hence carbazole carboxylic acids and their derivatives, such as the esters, acid anides of the aliphatic, aromatic and heterocyclic series, also derivatives of carbazole containing sulfur, such as for example, sufinic acids, carbazoles thiocyanates, further derivatives containing the isocyanic acid-, arsenic acid-, stibinic acid residue, and so on.

The specific methods of preparing these compounds are described in literature, for instance, in Houben, Die Methoden der Organischen Chemie, 1924, volume 4, pages 611 to 636.

Our new compounds are intended to find use as intermediates for dyestuffs or pharmaceutical products.

The following examples will illustrate our invention, without limiting it thereto:

*Example 1.*—54 kgs. of 1-amino carbazole are dissolved in 500 litres of water with the addition of 60 kgs. of 35% hydrochloric acid and diazotized in the customary manner with cooling by a solution of 20 kgs. of sodium nitrite, dissolved in 200 litres of water. The diazo solution is caused to run into boiling water. An abundant quantity of nitrogen is evolved, and on cooling, a light yellow substance separates out. The reaction proceeds according to the following reaction scheme:

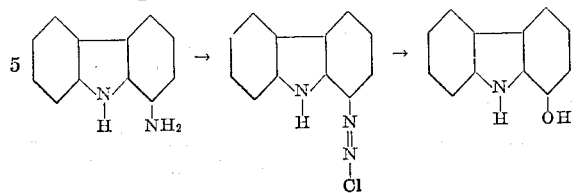

This is dissolved in caustic soda solution, filtered, and the 1-hydroxy carbazole is precipitated with hydrochloric acid. When crystallized from toluene, it forms colorless leaflets, which melt at 164° C.

*Example 2.*—54 kgs. of 2-amino carbazole are diazotized and boiled as in Example 1. The 2-hydroxy carbazole is precipitated from dilute caustic soda solution with acid. When crystallized from alcohol, it forms leaflets possessing silvery lustre, which melt at 276° C.

The 2-hydroxy carbazole has been identified by means of the customary reactions. The ethyl ether crystallizes from alcohol in shiny leaflets, which melt at 217° C. The acetyl derivatives, also forms leaflets, which melt at 188° C.

*Example 3.*—54 kgs. of 2-amino carbazole are diazotized as in Example 1. The diazo solution is caused to run into a hydrochloric acid solution of cuprous chloride, produced from 100 kgs. of copper sulfate and 50 kgs. of sodium chloride. On heating, a reaction takes place with the evolution of nitrogen. The residue is filtered and boiled with glacial acetic acid. On cooling, the 2-chloro carbazole separates in shiny colorless leaflets, which melt at 244° C. The product is identical with that synthetisized by Ullmann (Ann. 332, 97).

*Example 4.*—54 kgs. of 2-amino carbazole are diazotized, and the diazo solution is added to a heated solution of 125 kgs. of potassium cyanide and 116 kgs. of copper sulfate in 200 litres of water. The mixture is boiled until the evolution of nitrogen ceases, and the residue is extracted with benzene. The nitrile separates in long needles, melting at 138° C., which, by boiling with alcoholic caustic potash, are readily saponified with the production of carbazole-2-carboxylic acid. The latter crystallizes from alcohol in needless, melting at 319° C. It is easily soluble in sodium carbonate solution and caustic soda lye. For the purpose of identification the ethyl ester was produced, which crystallizes in leaflets, melting at 185° C., also various acid amides, for example, from para toluidine, which crystallizes in shiny elongated leaflets, melting at 294° C., or from amino-anthraquinone, a yellow powder, melting above 300° C.

*Example 5.*—54 kgs. of 1-amino carbazole are diazotized and converted to the nitrile as in Example 4. The crude nitrile is saponified into the carbazole-1-carboxylic acid by means of alcoholic caustic potash. When crystallized from glacial acetic acid, the carbazole-1-carboxylic acid crystallizes in colorless, blue fluorescent leaflets of the melting point 271–272° C. This acid is identical in every way with that obtained by Ciamician and Silber (G. 12, 272) by the action of carbonic acid on potassium carbazole.

*Example 6.*—54 kgs. of 2-amino carbazole are diazotized, the solution is saturated with sulfurous acid and decomposed with copper powder. When the evolution of nitrogen has ceased and after filtration, the residue is boiled with caustic soda lye. The sulfinic acid is then precipitated with mineral acid. For the purpose of purification, it is again dissolved in caustic soda, and the sodium salt of the carbazole-2-sulfinic acid is separated by means of sodium chloride in the form of a faintly yellow sandy powder.

The sulfinic acid shows the normal reactions, such as for example, on oxidation with alkali permanganate, it is converted into the sulfonic acid, or on reduction, the mercaptan or disulfide is produced.

We claim:

1. The process which comprises diazotizing a compound of the general formula:

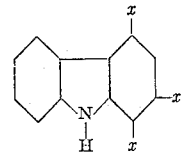

wherein one $x$ stands for an amino group and the other $x$'s stand for hydrogen or any monovalent substituent, and wherein the carbazole nucleus may be further substituted, and subjecting the diazocompound to a reaction customarily employed on diazotized aromatic amines for replacing the diazonium group by a monovalent substituent.

2. The process which comprises diazotizing a compound of the general formula:

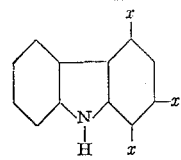

wherein one $x$ stands for an amino group and the other $x$'s stand for hydrogen, and subjecting the diazocompound to a reaction customarily employed on diazotized aromatic amines for replacing the diazonium group by a monovalent substituent.

3. The process which comprises diazotizing a compound of the general formula:

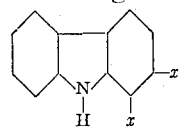

wherein one $x$ stands for an amino group and the other $x$ stands for hydrogen, and replacing the diazonium group by a substituent of the group consisting of halogen, the hydroxy-, cyanic- and sulfinic acid groups.

4. The process which comprises diazotizing a compound of the general formula:

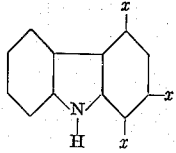

wherein one $x$ stands for an amino and the other $x$'s stand for hydrogen, and replacing the diazonium group by a substitutent of the group consisting of halogen, the hydroxy-, cyanic- and sulfinic acid groups.

5. The process which comprises diazotizing a compound of the general formula:

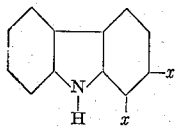

wherein one $x$ stands for an amino group and the other $x$ stands for hydrogen, and boiling the aqueous solution of the diazonium compound until the evolution of nitrogen has finished.

6. The process which comprises diazotizing a compound of the general formula:

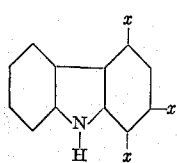

wherein one $x$ stands for an amino group and the other $x$'s stand for hydrogen, and boiling the aqueous solution of the diazonium compound until the evolution of nitrogen has finished.

7. The process which comprises diazotizing 2-amino-carbazole, introducing the solution of the diazonium compound into boiling water and boiling until the evolution of nitrogen has finished.

8. As new products the compounds of the probable general formula:

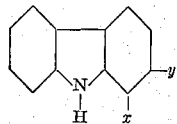

wherein $x$ stands for a substituent of the group consisting of hydrogen, halogen, the cyanic and sulfinic acid groups, $y$ stands for a substituent of the group consisting of hydrogen, the hydroxy, the cyanic and the sulfinic acid groups, but one of the letters $x$ and $y$ meaning hydrogen, and wherein the carbazole nucleus may be further substituted, being valuable intermediate products in the manufacture of dyestuffs and of pharmaceutical substances.

9. As new products the compounds of the probable general formula:

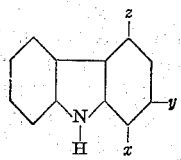

wherein $x$ stands for a substituent of the group consisting of hydrogen, halogen, the cyanic and sulfinic acid groups, $y$ stands for a substituent of the group consisting of hydrogen, the hydroxy, the cyanic and the sulfinic acid groups, and $z$ stands for a substituent of the group consisting of hydrogen, halogen, the hydroxy, cyanic and sulfinic acid groups, but two of the letters $x$, $y$ and $z$ meaning hydrogen, and wherein the carbazole nucleus may be further substituted, being valuable intermediate products in the manufacture of dyestuffs and of pharmaceutical substances.

10. As new products the compounds of the probable general formula:

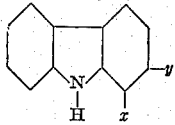

wherein $x$ stands for a substituent of the group consisting of hydrogen, halogen, the cyanic and sulfinic acid groups, $y$ stands for a substituent of the group consisting of hydrogen, the hydroxy, the cyanic and the sulfinic acid groups, but one of the letters $x$ and $y$ meaning hydrogen, being valuable intermediate products in the manufacture of dyestuffs and of pharmaceutical substances.

11. As new products the compounds of the probable general formula:

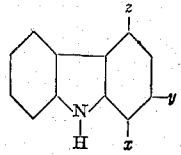

wherein $x$ stands for a substituent of the group consisting of hydrogen, halogen, the cyanic and sulfinic acid groups, $y$ stands for a substituent of the group consisting of hydrogen, the hydroxy, the cyanic and the sulfinic acid groups, $z$ stands for a substituent of the group consisting of hydrogen, halogen, the hydroxy, cyanic and sulfinic acid groups, but two of the letters $x$, $y$ and $z$ meaning hydrogen, being valuable intermediate products in the manufacture of dyestuffs and of pharmaceutical substances.

12. As new products the compounds of the probable general formula:

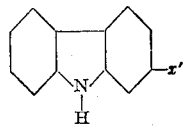

wherein $x'$ stands for a substituent of the group consisting of the hydroxy, cyanic and sulfinic acid groups, being valuable intermediate products in the manufacture of dyestuffs and of pharmaceutical substances.

13. As a new product 2-hydroxy-carbazole, crystallizing in leaflets having a silvery lustre, being soluble in organic solvents and having a melting point of 276° C., and being a valuable intermediate product in the manufacture of dyestuffs and of pharmaceutical substances.

In testimony whereof we have hereunto set our hands.

FRITZ BALLAUF. [L. S.]
FRIEDRICH MUTH. [L. S.]
ALBERT SCHMELZER. [L. S.]